(12) United States Patent
Yumura et al.

(10) Patent No.: US 6,227,334 B1
(45) Date of Patent: May 8, 2001

(54) ELEVATOR GOVERNOR CHECKING AND ADJUSTING METHOD

(75) Inventors: Takashi Yumura; Mineo Okada, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/595,012

(22) Filed: Jun. 16, 2000

Related U.S. Application Data

(63) Continuation of application No. PCT/JP98/00798, filed on Feb. 26, 1998.

(51) Int. Cl.[7] .................................................. B66B 5/16
(52) U.S. Cl. ........................... 187/359; 187/373; 188/165
(58) Field of Search .................................. 187/359, 373, 187/376, 367, 286, 288, 299, 414, 353; 188/161, 164, 165, 188, 189

(56) References Cited

U.S. PATENT DOCUMENTS

| | | | |
|---|---|---|---|
| 5,301,773 | 4/1994 | Jamieson et al. ..................... | 187/376 |
| 5,366,044 | 11/1994 | Jamieson et al. ..................... | 187/359 |
| 5,467,850 | * 11/1995 | Skalski ................................. | 187/165 |
| 5,628,385 | * 5/1997 | Yumura et al. ....................... | 187/373 |
| 6,029,951 | * 2/2000 | Guggari ................................ | 187/250 |

FOREIGN PATENT DOCUMENTS

| | | |
|---|---|---|
| 5-147852 | 6/1993 | (JP) . |
| 8-262058 | 10/1996 | (JP) . |
| 9-40317 | 2/1997 | (JP) . |

\* cited by examiner

*Primary Examiner*—Jonathan Salata
(74) *Attorney, Agent, or Firm*—Sughrue, Mion, Zinn, Macpeak & Seas, PLLC

(57) ABSTRACT

In a method for checking and adjusting an elevator governor which includes an emergency stop switch 20*a*) for tuning off the power supply of an elevator hoist to brake it; first and second fixed conductive guide rails (18) extending vertically the entire length of an elevator hoistway; an emergency brake (31) attached to an elevator car assembly containing an elevator car and a balance weight balancing therewith, for grabbing the first fixed conductive guide rail (18) to brake the elevator car assembly by friction; a magnet assembly (16) mounted on the elevator car such that it is displaced by an eddy current induced based on the relative speed between the second fixed conductive guide rail and the magnet assembly disposed opposite thereto; and an emergency stop mechanism for actuating the emergency brake (31) upon detecting that the displacement of the magnet assembly (16) has reached displacement corresponding to a critical speed critical; a pseudo speed generator, which generates speed by straight-line motion or rotation of a conductive member of substantially the same material as that for the fixed conductive guide rails, is used in combination with the magnet assembly to make a check to see ability for normal operation of the governor in emergency situations.

15 Claims, 13 Drawing Sheets

GUIDE
RAIL 18

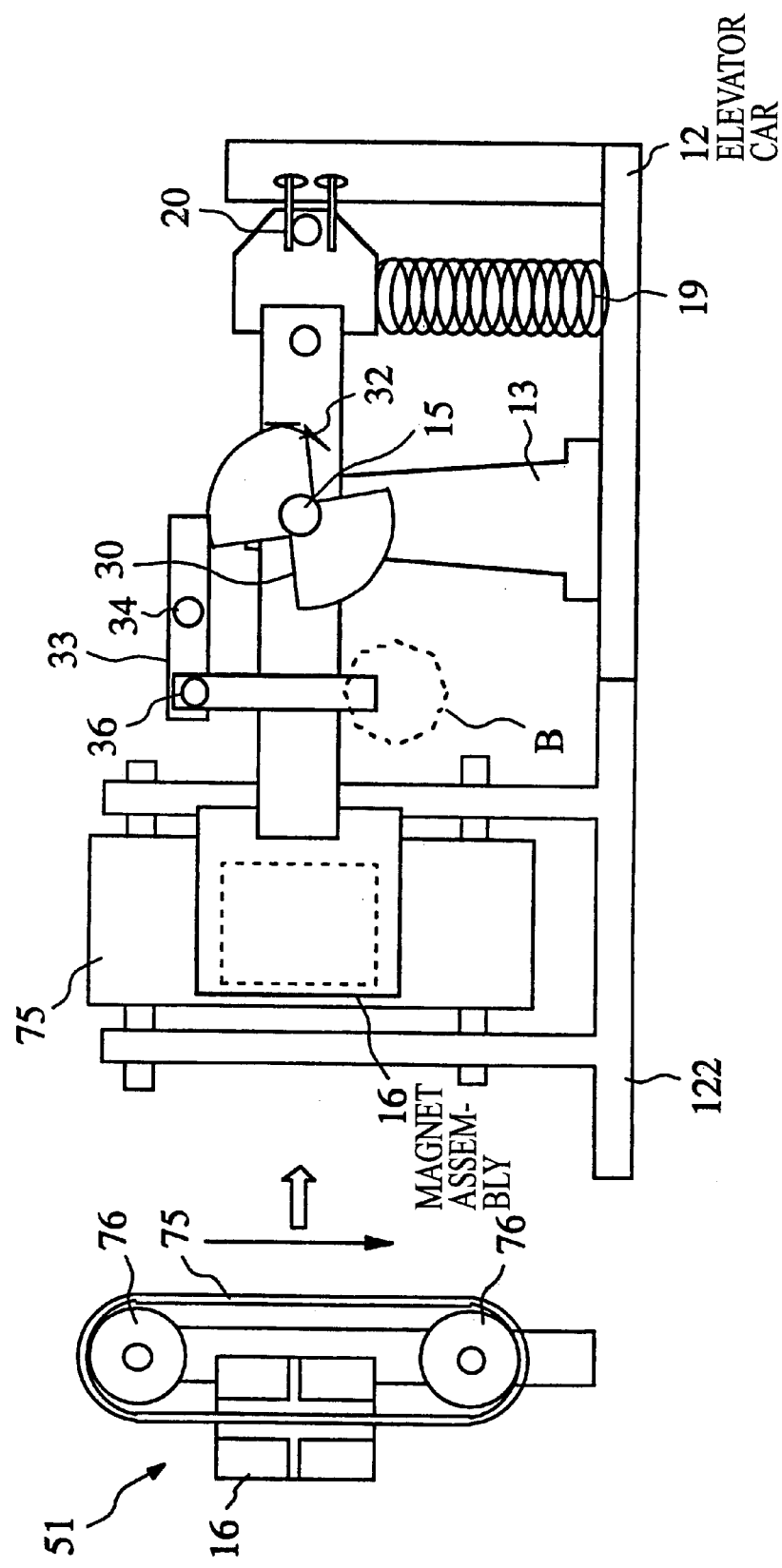

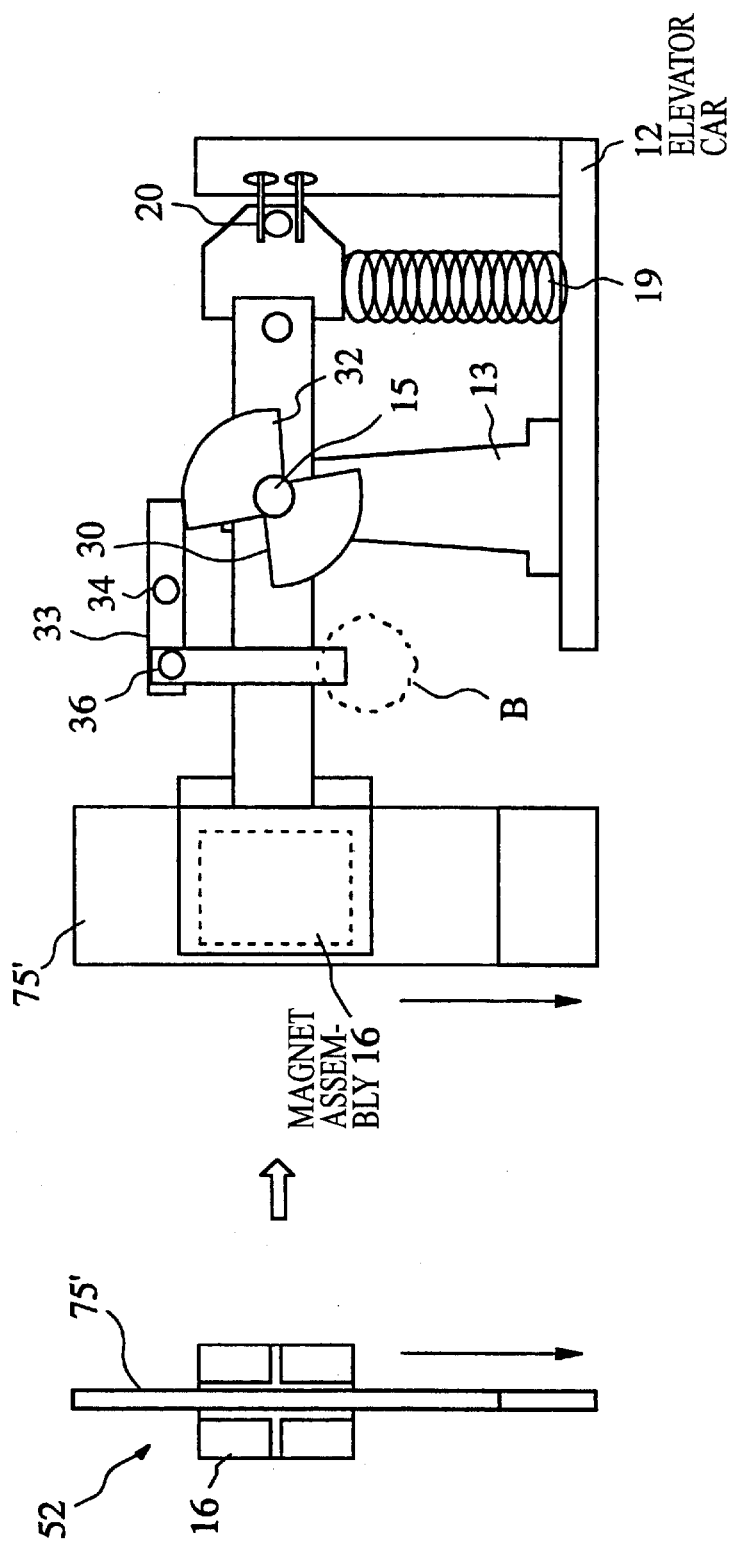

ELEVATOR GOVERNOR CHECKING AND ADJUSTING METHOD

CROSS-REFERENCE TO THE RELATED APPLICATION

This application is a continuation of International application No. PCT/JP98/00798, whose International filing date is Feb. 26, 1998, the disclosures of which application are incorporated by reference herein.

BACKGROUND OF THE INVENTION

1. Field of the Invention

The present invention relates to a method for checking and adjusting a speed governor of an elevator for carrying passengers or freight from one level to another.

2. Description of the Prior Art

FIG. 1 is a front view depicting a general construction of a conventional elevator governor (hereinafter referred to simply as a governor) checking and adjusting system disclosed, for instance, in Japanese Pat. Appln. No. 7-190922; FIGS. 2(a) and (b) are partly enlarged front and plan views of the governor checking and adjusting system shown in FIG. 1.

In FIG. 1, reference numeral 12 denotes an elevator car; 13 denotes a base of the governor mounted on the roof of the elevator car 12; 14 denotes arms rotatably attached to a rotary shaft 15 of the base 13; 16 denotes a magnet assembly connected to the arms 14 at one end thereof to detect overspeeding of the elevator car 12; 16a denotes a pair of opposed magnets bonded on a U-shaped back yoke 16b; 17 denotes a balance weight mounted on the arms 14 at the other end thereof such that it balances with the magnet assembly; and 18 denotes a pair of fixed conductive guide rails extending vertically along both sides of the elevator car 12.

The magnet assembly 16 comprises the pair of magnets 16a disposed opposite one of the fixed conductive guide rails 18 and the back yoke 16b providing a path for magnetic fluxes emanating from the two magnets 16a. The arms 14, the rotary shaft 15 of the base 13, the magnet assembly 16 and the balance weight 17 constitute a force detecting mechanism.

Reference numeral 19 denotes springs both support the arms 14 and convert force exerted on the balance weight 17, that is, a reaction force, to displacement of the balance weight 17; 20a denotes an elevator car stop switch which is actuated by the displacement of the balance weight 17; 31 denotes emergency brakes; and 32 denotes a cam for actuating a latch mechanism described below. The cam 32 is connected to one end of the rotary shaft 15, and consequently the cam 32 turns as the rotary shaft rotates.

Reference numeral 33 denotes a latch arm, 34 a latch shaft, 35 a coupling arm, and 36 a latch pin, which constitute the latch mechanism that operates in ganged relation to the cam 32. Reference numeral 21 denotes a pull-up rod, and 22 pull-up springs, which constitute a transmission for transmitting instructions for the actuation of the emergency brakes 31, the pull-up rod 21 being coupled by the latch pin 36 to the latch mechanism.

The elevator employing the present invention is of the type that the elevator car 12 for freight or passengers moves up and down in an elevator hoistway in a steel tower or high-rise building and that a speed governor is loaded on the elevator case 12 as a substitute for governor ropes used in the past. In a machine room at the top of the elevator hoistway there are provided a hoist, a switchboard (both not shown) and so on; the elevator car 12 and a balance weight (not shown) hang from the hoist such that the elevator car 12 is moved up and down just like a well bucket. In the elevator hoistway there are provided the fixed conductor guides 18 for the elevator car 12 and the balance weight, and in a pit at the bottom of the elevator hoistway there are placed buffers (not shown) for the elevator car 12 and the balance weight.

The above-described governor operates as follows.

As depicted in FIGS. 2(a) and (b), the magnet assembly 16 made up of the magnets 16a and the back yoke 16b produces a magnetic field in the flange or vane of the fixed conductive guide rail 18 positioned between the opposed magnets 16a. Upon the magnetic field traveling in the fixed conductive guide rail 18 as the elevator car 12 moves up or down, an eddy current is induced in the guide rail 18 which cancels intensity variations of the magnetic field, causing the magnet assembly 16 to produce an electromagnetic reaction force of a magnitude corresponding to the speed of the elevator car 12 in a direction opposite to the up or down run direction of the elevator car 12. The reaction force thus produced is converted by the arms 14 and the springs 19 to upward or downward displacement of the magnets 16a and the balance weight 17.

When the ascent/descent speed of the elevator car 12 has reached a first overspeed value (normally approximately 1.3 times higher than a rated speed, see FIG. 3) in excess of a predetermined value, a force corresponding to the increased speed of the elevator car 12 is exerted on the magnet assembly 16, causing the balance weight 17 to be displaced accordingly. And, when this displacement reaches a first operating point, the elevator car stop switch 20a equipped in a brake operates to tun off the power supply of the elevator drive system, bringing the elevator car 12 to a stop. Even in the case where the ascent or descent speed of the elevator car 12 reaches a second overspeed value (normally about 1.4 times higher than the rated speed, see. FIG. 3) for some reason and the displacement of the balance weight 17 goes up to a second operating point, the balance weight 17 is further displaced corresponding to the increased speed of the elevator car 12, and the cam 32 ganged with the balance weight 17 turns, causing the latch arm 33 to enter into a recess 30 of the cam 32. Then the pull-up rod 21 is pulled down by the pull-up springs 22 through the latch mechanism, and the emergency brakes 31 mounted on the elevator car 12 are actuated to drive wedges into the fixed guide rails 18, bringing the elevator car 12 to a quick stop by friction.

Such a speed governor must be checked for normal operation responsive to the overspeeding elevator car at the time of installation or maintenance, but no method therefor has been established so far. And the speed governor may sometimes need on-site adjustment, but no system or scheme therefor has been implemented, either.

Because of such a construction as described above, the conventional governor has a problem that no methods have been established for checking and adjusting its operation during on-site installation or maintenance.

SUMMARY OF THE INVENTION

It is therefore an object of the present invention to provide an elevator governor checking and adjusting method that permits simple and accurate inspection and maintenance of the governor.

According to an aspect of the present invention, during checking and adjustment of the governor an emergency stop mechanism with latch means for actuating emergency brakes is held disconnected from the latter which grabs a first fixed conductive guide rail to stop an elevator car assembly by friction. This ensures preventing the operation of the emergency brakes, and hence permits checking and adjustment of the governor with safety.

According to another aspect of the present invention, the elevator governor is checked and adjusted without disconnecting the latch means from the emergency brakes. This enables the governor to be checked and adjusted under exactly the same conditions as in the actual operation of the elevator, and hence provides increased accuracy in checking and adjusting the governor.

According to another aspect of the present invention, since first and second fixed conductor guides are made of the same material, they can be used as guides rails, too, which extend vertically the entire length of the elevator hoistway.

According to another aspect of the present invention, the elevator car is acrtualy driven to move in an up or down direction and a check is made to see whether the emergency stop switch and the emergency stop mechanism normally operate when the travel speed of the elevator car has reached predetermined first and second critical speeds. This permits simple and low-cost inspection and adjustment of the governor.

According to another aspect of the present invention, a force-displacement converter provided with means by which force produced in a magnet assembly in accordance with the travel speed of the elevator car is used, a force-displacement coefficient of the converter being set small such that (rated speed)/(detected critical speed) is obtained, and the elevator car is actually driven to move in the up or down direction during checking and adjusting the operation of said governor. This enables the governor to be checked and adjusted simply by riving the elevator car at the rated speed.

According to another aspect of the present invention, an auxiliary magnetic circuit is additionally used so that the force produced in the magnet assembly in accordance with the travel speed of the elevator car becomes (detected critical speed)/(rated speed) at the time of checking and adjustment of the governor, and the elevator car is actually driven to move in the up or down direction. This permits checking and adjustment of the governor the rated speed, and hence makes it simple and safe.

According to another aspect of the present invention, the magnet assembly is combined with a pseudo speed generator for generating speed by driving in a straight line or rotating a conductive member made of a material having substantially the same properties as those of the material for the second fixed conductive guide rail. This permits simple and safe checking and adjustment of the governor without actually driving the elevator car to move in the up or down direction.

According to another aspect of the present invention, the second fixed conductive guide rail is disengaged from the governor and the pseudo speed generator is placed at the position of the second fixed conductive guide rail disengaged. This permits simple and safe checking and adjustment of the governor without actually driving the elevator car to move in the up or down direction.

According to another aspect of the present invention, the entire governor structure is dismounted from the elevator car assembly and the pseudo speed generator is combined with the governor structure for checking and adjusting the governor. This permits factory-testing of governors as well as on-site inspection.

According to another aspect of the present invention, a conductive disc unit provided with a disc made of about the same material as that for the second fixed conductive guide rail is placed at the same position as that of said second fixed conductive guide rail the disc is driven to simulate the actual up or down travel of the elevator car, and a check is made to see if the emergency stop switch and the emergency brake operate at the first and second critical speeds. This permits simple and safe checking and adjustment of the governor without actually driving the elevator car to move in the up or down direction.

According to another aspect of the present invention, a rotating unit provided with a partly flat cylindrical member made of about the same material as that for the second fixed conductive guide rail is placed at the same position as that of the second fixed conductive guide rail, the cylindrical member is driven to simulate the actual up or down travel of the elevator car, and a check is made to see if the emergency stop switch and the emergency brake operate when the first and second critical speeds are reached.

According to another aspect of the present invention, a conductive plate made of about the same material as that for the second fixed conductive guide rail is placed at the same position as that of the second fixed conductive guide rail, the conductive plate is dropped to fall freely or moved by driving means to simulate the actual up or down travel of the elevator car, and a check is made to see if the emergency stop switch and the emergency brake operate when said first and second critical speeds are reached. This permits simple and safe checking and adjustment of the governor without actually driving the elevator car to move in the up or down direction.

According to another aspect of the present invention, a converter is used which is provided with converting means by which force exerted on the magnet assembly mounted on a pair of arms at one end there of is converted to displacement or rotation of the magnet assembly, and the displacement or rotation of the magnet assembly is transmitted to the emergency stop mechanism, and the height of the base of the governor, the length of a pair of arms and the structure of a balance weight mounted on the arms on the side opposite to the magnet assembly are chosen such that the magnet assembly and the balance weight can turn 180 degree. With this method, when the magnet assembly is displaced or turned for checking the governor, the emergency stop mechanism is actuated as usual, allowing ease in checking the operation of the governor.

According to another aspect of the present invention, the magnet assembly and the balance weight can be dismounted as one piece or separately, and they can be disposed at the position of the other. With this method, when the magnet assembly is displaced or turned for checking the governor, the emergency stop mechanism is actuated as usual, allowing ease in checking the operation of the governor.

According to still another aspect of the present invention, a converter is used which is provided with converting means by which force exerted on the magnet assembly is converted to displacement or rotation of the magnet assembly, the displacement or rotation of the magnet assembly is transmitted to the emergency stop mechanism. Besides, the height of the base of the governor, the length of the pair of arms and the structure of the balance weight are chosen such that the magnet assembly and the balance weight can turn 180 degree. And, a first sensor for measuring force exerted on the arms by an actuator and a second sensor for measuring the physical amount of displacement or angular motion of the arms by said force exerted thereon are used. With this method, it is possible to determine whether the arms are displaced as predetermined or whether the emergency stop mechanism operates when the predetermined speed has been reached. And when they do not operate as predetermined, it is possible to accurately detect the required amount of adjustment. In addition, the governor can be checked and adjusted easily without actually driving the elevator car to move in the up or down direction.

BRIEF DESCRIPTION OF THE DRAWINGS

Other objects, features and advantages of the present invention will become more apparent from the following description taken in conjunction with the accompanying drawings, in which:

FIG. 9(a) is a front view of a modified form of the elevator governor check and adjustment system according to the third embodiment of the present invention;

FIG. 9(b) is its left side view;

FIG. 10(a) is a front view of another modified form of the elevator governor check and adjustment system according to the third embodiment of the present invention;

FIG. 10(b) is its left side view;

DETAILED DESCRIPTION OF THE PREFERRED EMBODIMENT

Figure 1:
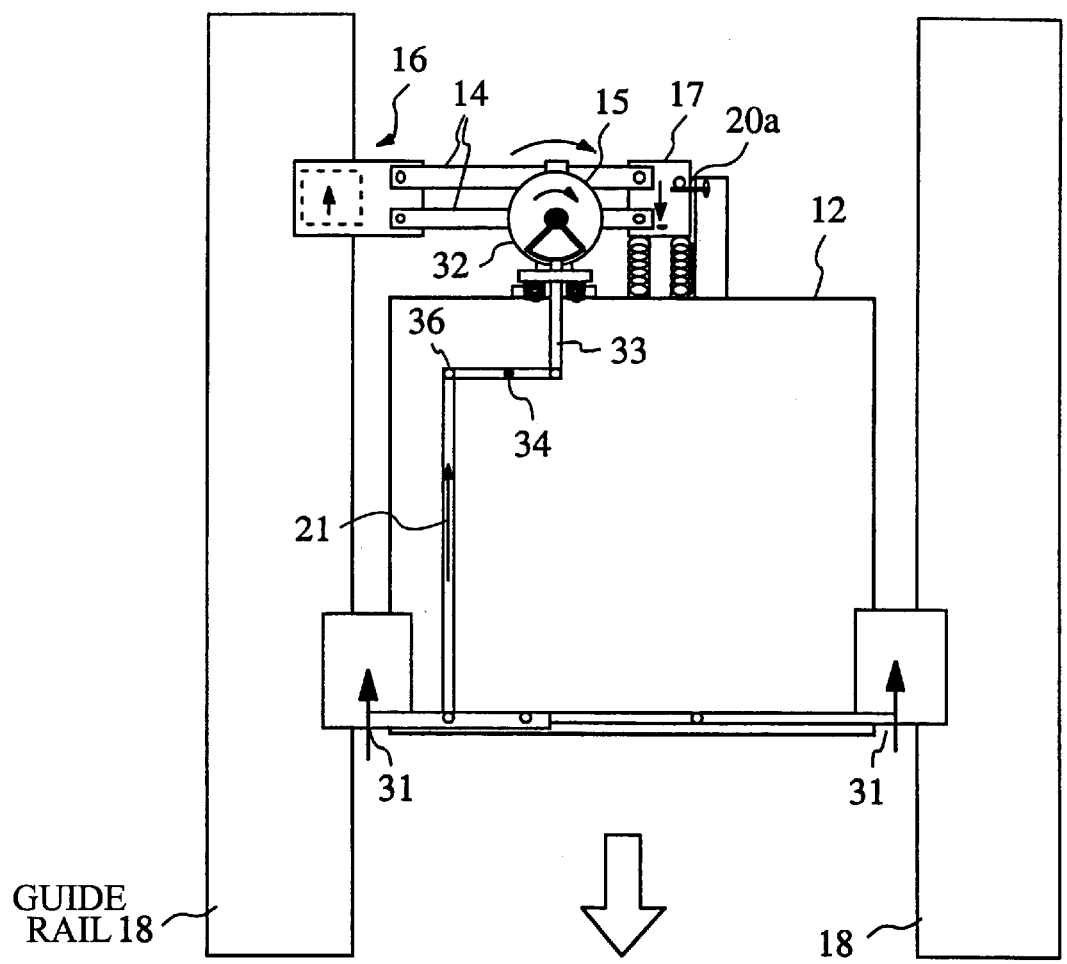
FIG. 1 is a diagram schematically illustrating a general construction of a conventional elevator governor check and adjustment system.
Figure 2A:
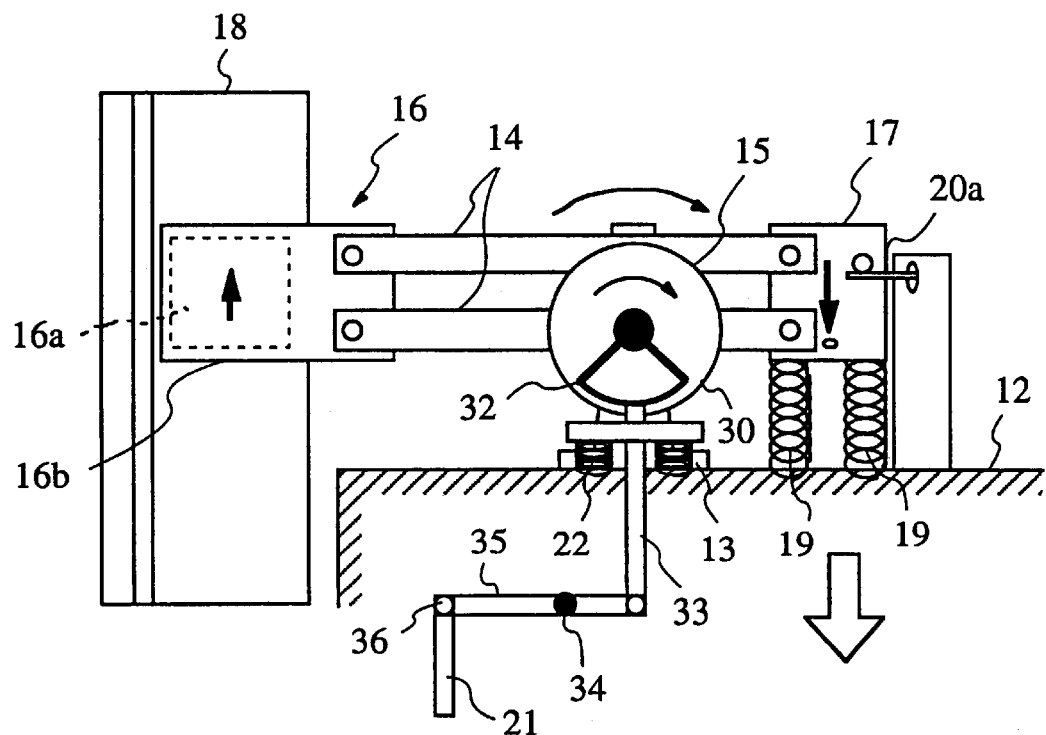
FIG. 2(a) is its front view.
Figure 2B:
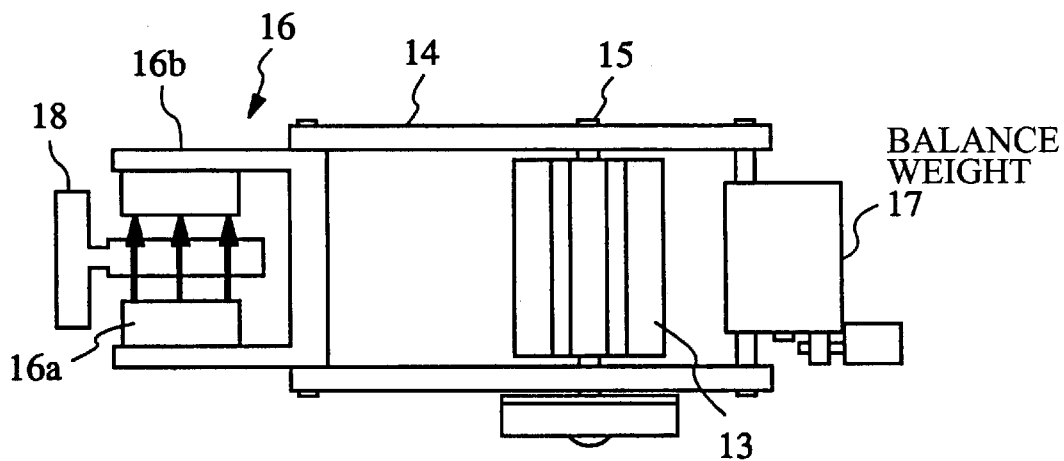
FIG. 2(b) is its top plan view.

To facilitate a better understanding of the present invention, a detailed description will be given, with reference to the accompanying drawings, of the best mode for carrying out the invention. Incidentally, the parts identical with or corresponding to those described previously in respect of the prior art example will be identified by the same reference numerals and no description will be repeated thereof.

Embodiment 1

Figure 4:
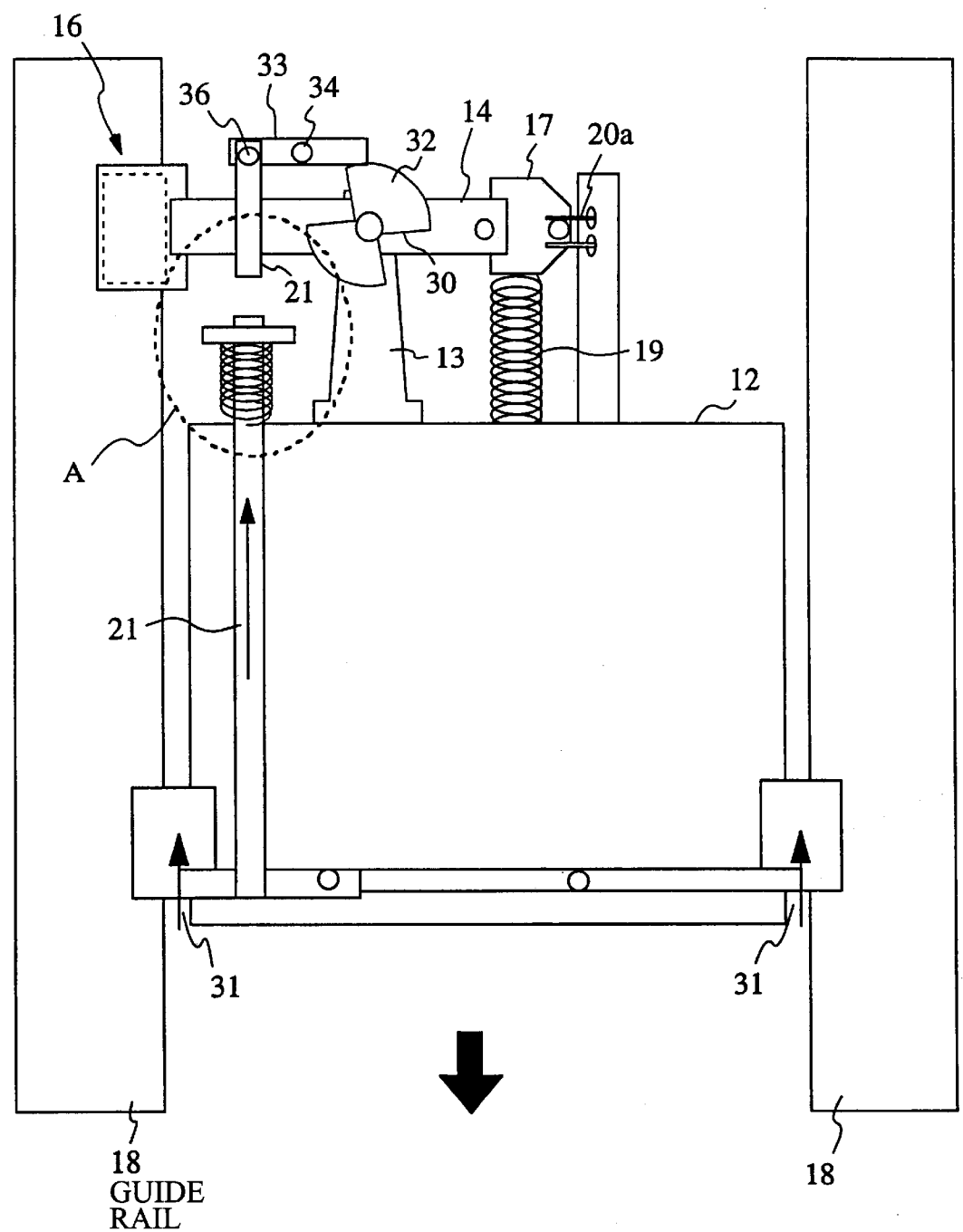
FIG. 4 is a diagram schematically illustrating a general construction of an elevator governor check and adjustment system according to a first embodiment of the present invention.
Figure 5A:
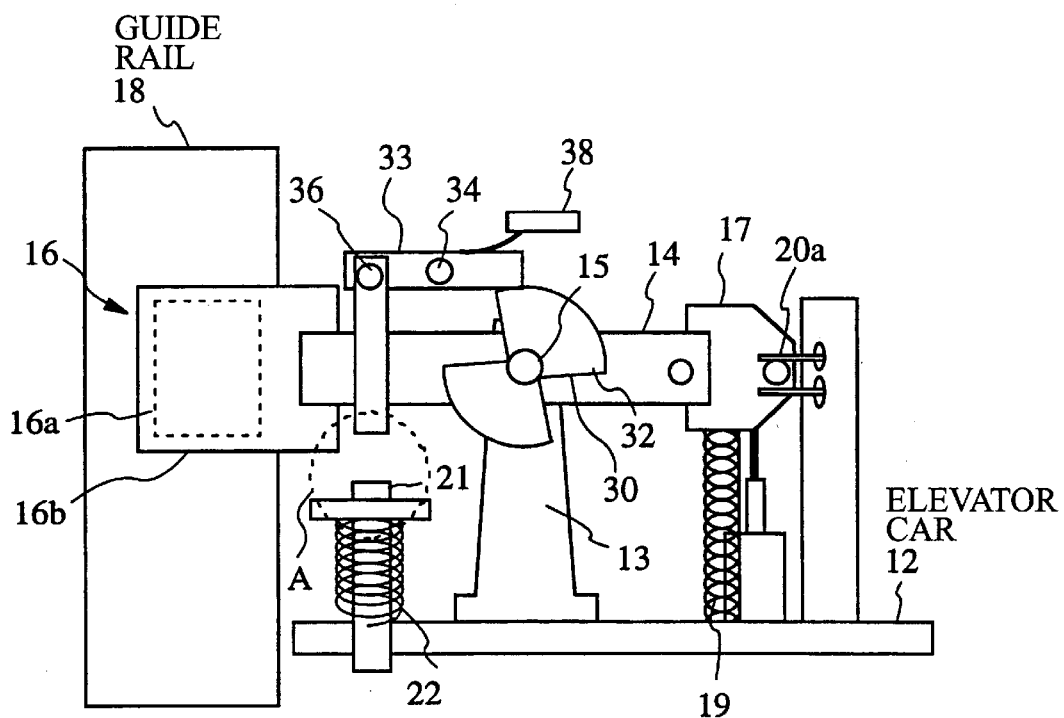
FIG. 5(a) is its front view.

FIG. 4 is a diagram schematically illustrating a general construction of the elevator governor (hereinafter referred to simply as a governor) check and adjustment mechanism according to a first embodiment (Embodiment 1). FIGS. 5(a) and (b) are front and plan views respectively depicting the governor check and adjustment mechanism according to this embodiment.

In the drawings, reference numeral 12 denotes an elevator car, 13 denotes a base of the governor mounted on the roof of the elevator car 12; 14 denotes a pair of arms rotatably supported by a rotary shaft 15 of the base 13; 16 denotes a magnet assembly coupled to the arms 14 at one end thereof to detect overspeeding of the elevator car 12; 16a denotes a pair of opposed magnets mounted on a U-shaped back yoke 16a; 17 denotes a balance weight coupled to the arms 14 at the other end thereof in a manner to provide balancing with the magnet assembly 16; and 18 denotes a pair of fixed conductive guide rails extending vertically along both sides of the elevator car 12.

The magnet assembly 16 comprises the pair of magnets 16a disposed opposite one of the fixed conductive guide rails 18 and the back yoke 16b that provides a path for magnetic fluxes emanating from the two magnets 16a. The arms 14, the rotary shaft 15 of the base 13, the magnet assembly 16 and the balance weight 17 constitute a force detecting mechanism.

Reference numeral 19 denotes a spring which supports the arms 14 and converts force exerted on the balance weight 17, that is, a reaction force, to displacement of the balance weight 17; 20a denotes an elevator car stop switch which is actuated by the displacement of the balance weight 17; 31 denotes emergency brakes; and 32 denotes a cam for actuating a latch mechanism. The cam 32 for actuating the emergency brakes, which perform an emergency function when the elevator car 12 reaches the second overspeed, is connected to one end of the rotary shaft 15, and consequently the cam 32 turns with the rotation of the rotary shaft. Incidentally, the cam 32 has a pair of sector members that are point-symmetrical with respect to the rotary shaft 15.

Reference numeral 33 denotes a latch arm, 34 a latch shaft, and 36 a latch pin, which constitute a latch mechanism that operates in ganged relation to the cam 32. Reference numeral 21 denotes a pull-up rod, and 22 a pull-up spring, which constitute a transmission for transmitting instructions for the actuation of the emergency brakes 31, the pull-sup rod 21 being coupled by the latch pin 36 to the latch mechanism. The latch mechanism and the force detecting mechanism constitute an emergency stop mechanism.

The governor according to this embodiment operates as follows.

Figure 5B:
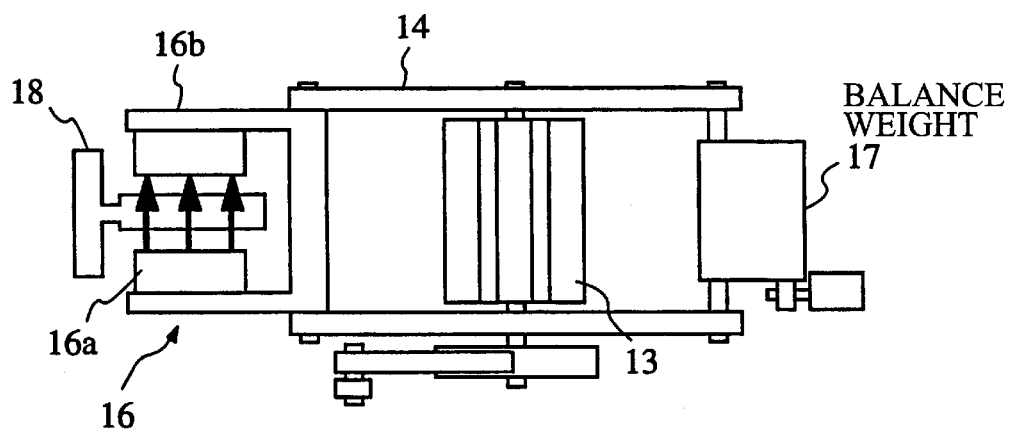
FIG. 5(b) is its top plan view.

As depicted in FIG. 5(b), the magnet assembly 16 made up of the magnets 16a and the back yoke 16b produces a magnetic field in the flange or vane of the fixed conductive guide rail 18 positioned between the opposed magnets 16a. Upon the magnetic field moving in the fixed conductive guide rail 18 as the cage 12 moves up or down, an eddy current is induced in the guide rail 18 cancels intensity variations of the magnetic field, causing the magnet assembly 16 to produce an electromagnetic reaction force of an intensity corresponding to the speed of the elevator car 12 between the magnets 16a in a direction opposite to the up or down run direction of the elevator car 12. The reaction force thus produced is converted by the arms 14 and the spring 19 to upward or downward displacement of the magnets 16a and the balance weight 17.

Figure 3:
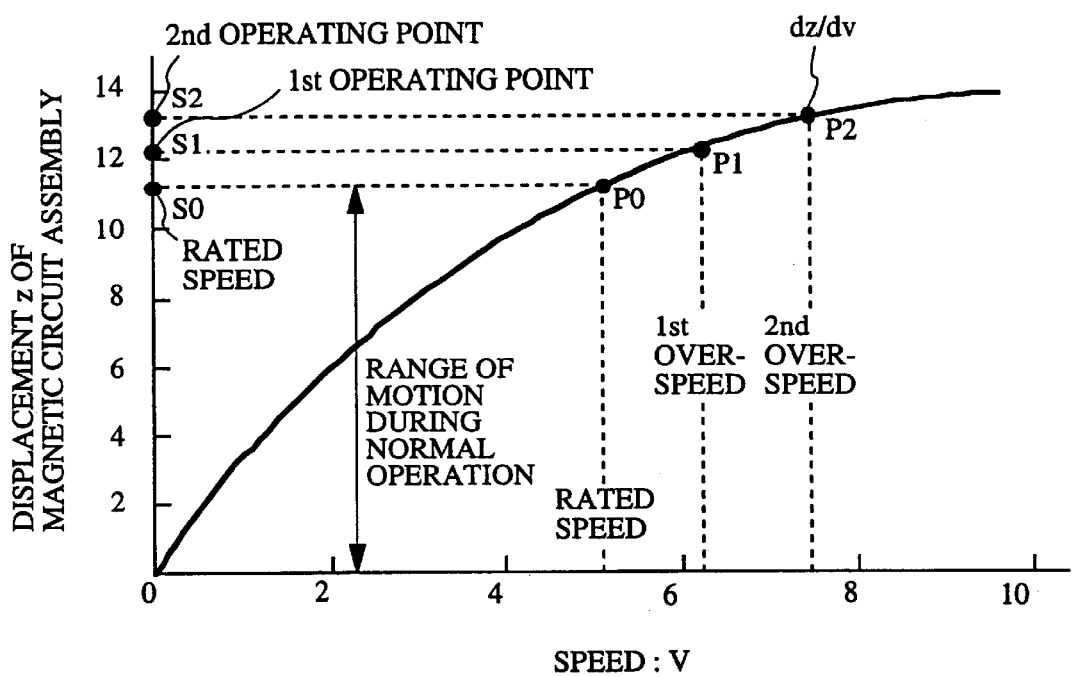
FIG. 3 is a graph showing the relationship of displacement of the magnet assembly to the speed of the elevator car in the conventional elevator governor.

When the ascent or descent speed of the cage 12 reaches a first overspeed value (normally approximately 1.3 times higher than a rated speed, see FIG. 3) in excess of a predetermined value, the magnets 16a are subjected to a force corresponding to the increased speed of the elevator car 12 is exerted on the magnets 16a, causing the balance weight 17 to be displaced accordingly. And, when this displacement reaches a first operating point (see FIG. 3), the elevator car stop switch 20a equipped in a brake operates to turn off the power supply to the hoist and other elevator drive system (not shown), bringing the elevator car 12 to a stop.

Even in the case where the speed of the elevator car 12 moving in the up or down direction reaches a second overspeed value (normally about 1.4 times higher than the rated speed) for some reason, if the balance weight 17 is further displaced corresponding to the increased speed of the elevator car 12 and its displacement goes up to the second operating point, the cam 32 tuns and hence allows the latch arm 33 to enter into the recess of the cam 32, then the pull-up rod 21 is pulled up by the pull-up spring 22 through the latch mechanism, and the emergency brakes 31 mounted on the elevator car 12 is actuated to bring the cage 12 to a quick stop by friction.

At the time of its installation or maintenance such a governor needs to be checked for ability to normally operate upon detecting the elevator car 12 moving at prescribed critical speeds (the first and second overspeeds) in the up or down direction. Furthermore, the governor may sometimes need on-site adjustment.

A description will be given of a method for checking and adjusting the elevator governor according to Embodiment 1.

In the checking and adjustment of such a governor as mentioned above, if the governor operates with the pull-up rod 21 held as it is, the emergency brakes 31 will also be activated ultimately, causing an unnecessary wear of the fixed conductive guide rails 18.

As a solution to this problem, the pull-up rod 21 for actuating the emergency brakes 31 is pre-disconnected from the latter as indicated by A in FIG. 4 so as to prevent them from operating in association with the governor during its inspection or maintenance. Then a simulation of the governor operation is done for inspection by actually driving the governor or apparently generating the travel speed of the elevator car 12 as if it is actually moving in the up or down direction.

In this instance, a check is made to see if the arms 14 tilt corresponding to the ascent or descent speed of the elevator car 12, actuating an emergency stop mechanism composed of the latch and force detecting mechanisms which in tun activates the elevator car stop switch 20a or emergency brakes 31 when the prescribed critical speed is reached.

To detect the operation of the emergency stop mechanism, a switch 38 is disposed in a latch portion formed by the cam 32. The switch 38 may be placed at other positions.

With the pull-up rod 21 mechanically disconnected as described above, the emergency brakes 31 stay out of operation, ensuring safe and easy inspection and adjustment of the governor.

Of course, the pull-up rod 21 may be held mechanically linked to the emergency brakes 31, in which case the governor is tested under exactly the same conditions as those for actual elevator driving operation—this permits more accurate and hence more reliable inspection of the governor.

Embodiment 2

In the inspection and adjustment of the elevator governor, it is necessary to make a check to determine whether the elevator car stop switch 20a or emergency brakes 31 normally work as prescribed when the travel speed of the elevator car 12 has reached the critical speed (for example, 1.3 or 1.4 times higher than the rated speed). In many cases, however, difficulty is encountered in driving the elevator car 12 at such high speeds.

This embodiment (Embodiment 2) is aimed at solving this problem by the method described below with reference to FIGS. 6 and 7.

Figure 6:
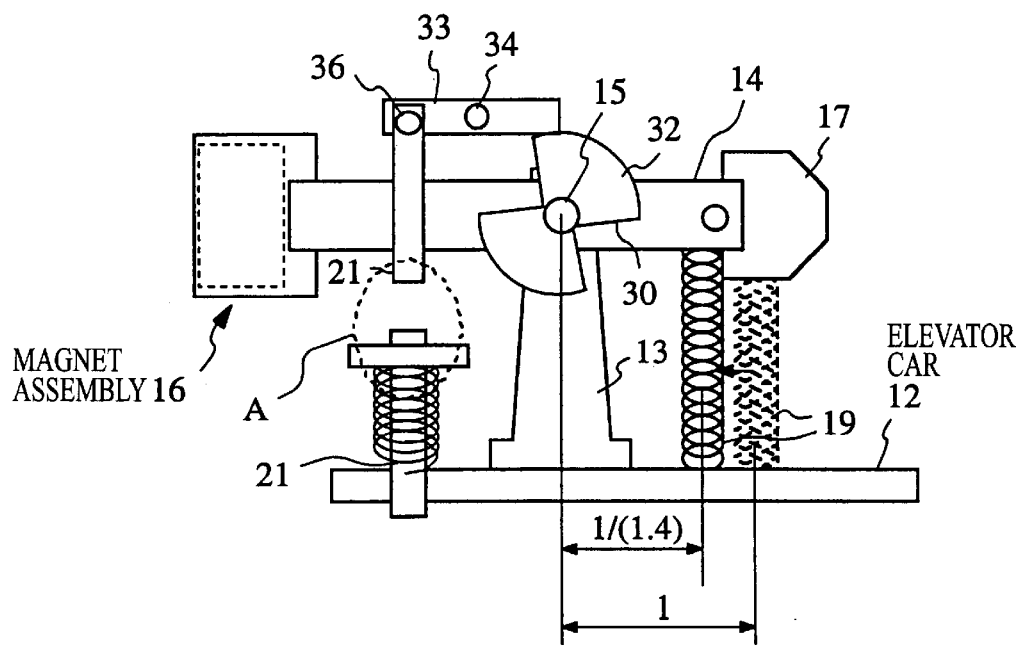
FIG. 6 is a front view of an elevator governor check and adjustment system according to a second embodiment of the present invention.

FIG. 6 is a front view showing a governor check and adjustment system which employs the method of this embodiment in which the position or strength of the spring 19 is so chosen as to enhance the sensitivity of the force detecting mechanism to the force exerted thereon.

The governor check and adjustment method of this embodiment will be described below.

The spring 19 is disposed at a position apart from the rotary shaft 15 by $1/1.3$ or $1/1.4$ of the distance between the rotary shaft 15 and the center of the balance weight as shown in FIG. 6. The governor is operated under the rated-speed driving condition to determine whether the balance weight 17 is displaced as predetermined. With this method, it is possible to conduct the simulation of driving the elevator car 12 at the actual critical speed. This can also be done simply by replacing the spring 19 with a spring $1/1.3$ or $1/1.4$ times weaker than the actual force instead of changing the position of the spring 19 as mentioned above. With this method, the elevator car 12 needs only to be driven at the rated speed to check the operation of the governor.

Figure 7:
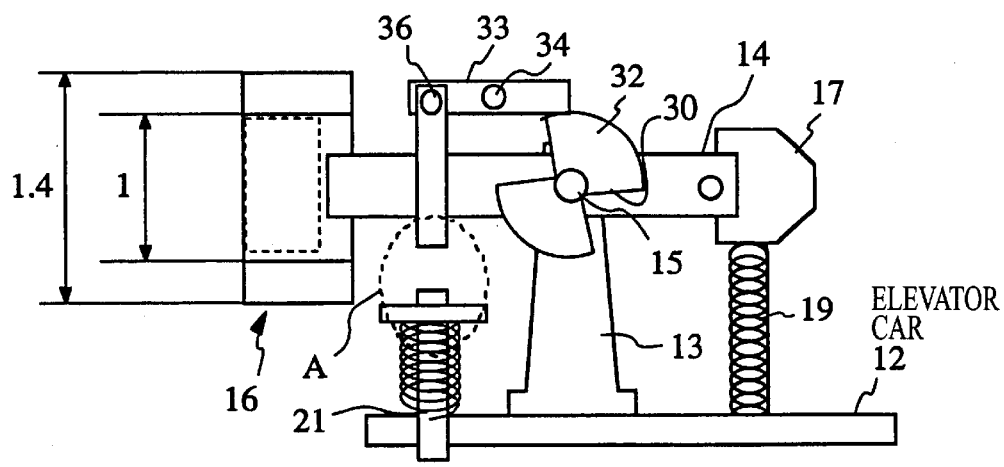
FIG. 7 is a front view of a modified form of the elevator governor check and adjustment system according to the second embodiment of the present invention.

FIG. 7 is a front view showing another governor check and adjustment system which employs the method of this embodiment. In this instance, a magnetic circuit (not shown) for adjustment use is additionally provided in the magnet assembly 16 to increase the force detecting sensitivity of the force detecting mechanism.

With the additional provision of the magnetic circuit in the magnet assembly 16 in a manner to cause, for example, a 1.3- or 1.4-fold increase in its magnetic force, it is possible to magnify the detected force by a factor of 1.3 or 1.4. Furthermore, the length or position of the arm(s) 14 may be freely chosen as long as the operation of the governor at the critical speed can be simulated under the rated-speed driving of the elevator.

By measuring the operation timing of each of the elevator car stop switch 20a and the emergency stop mechanism in response to the ascent or descent speed of the elevator car 12 and comparing the measured results with prescribed values, direct correspondence between the actual and the simulated operation of the governor can be detected, making it possible to determine if the governor normally operates when the prescribed excess speed is reached.

As described above, this embodiment permits checking the operation of the governor at the rated speed for normal operation of the elevator.

Embodiment 3

Figure 8A:
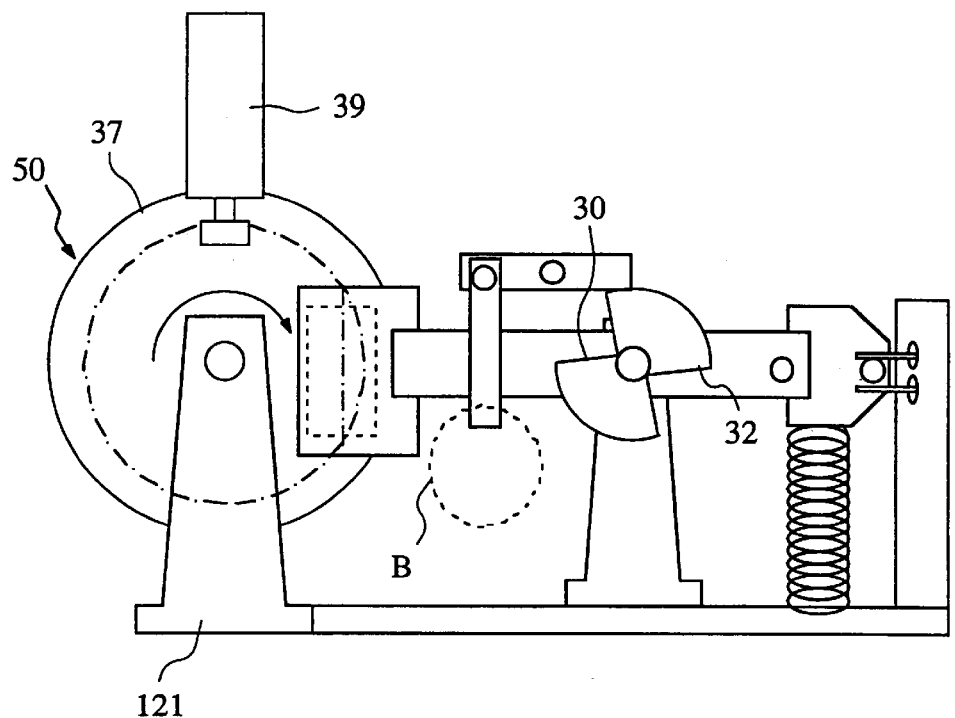
FIG. 8(a) is a front view of an elevator governor check and adjustment system according to a third embodiment of the present invention.
Figure 8B:
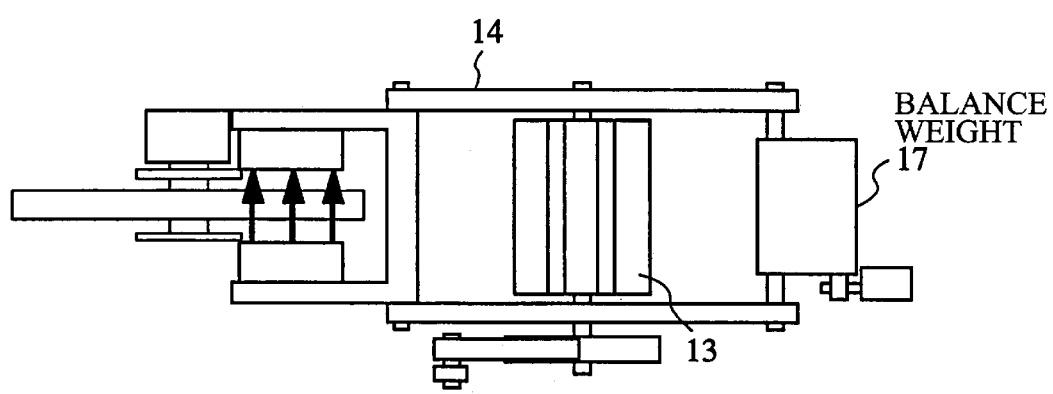
FIG. 8(b) is its top plan view.
Figure 11A:
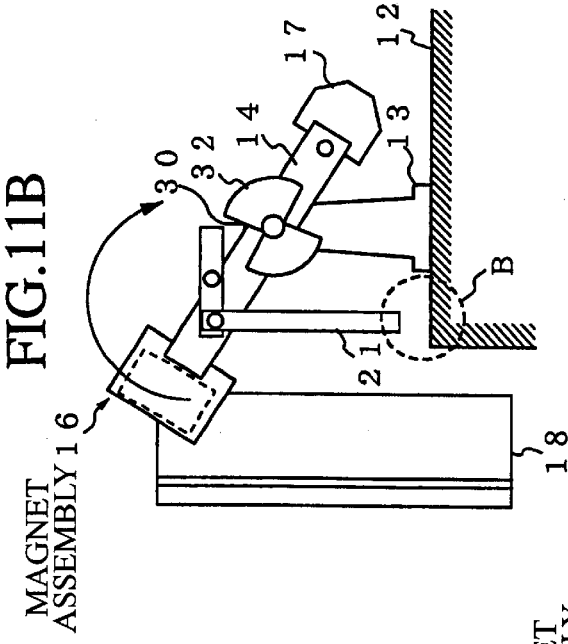
FIGS. 11(a) to (d) are each a front view of an elevator governor check and adjustment system according to a fourth embodiment of the present invention, for explaining its operation.
Figure 11B:
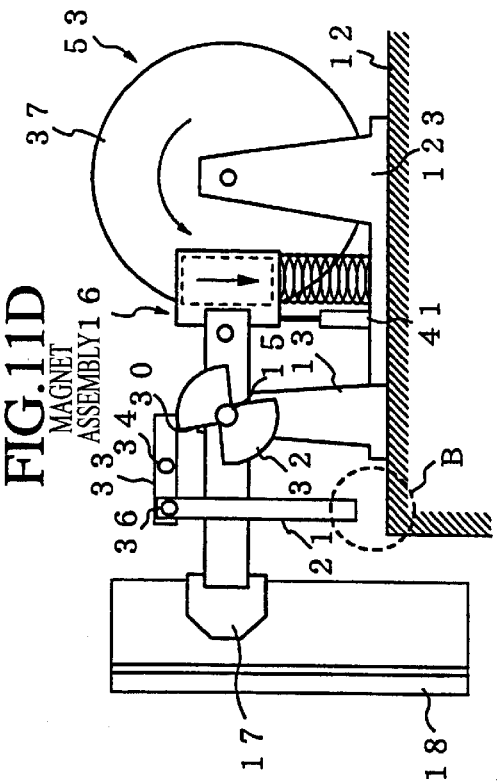
Figure 11C:
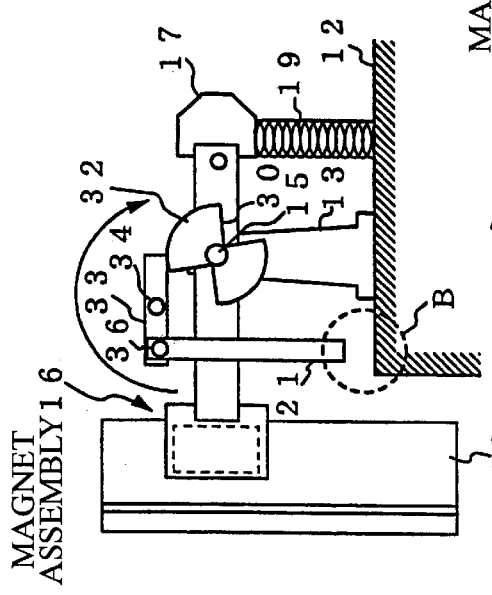
Figure 11D:
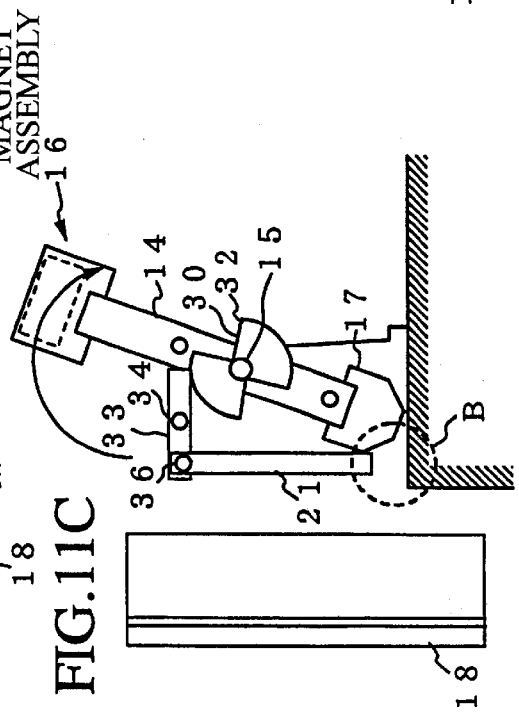
Figure 12B:
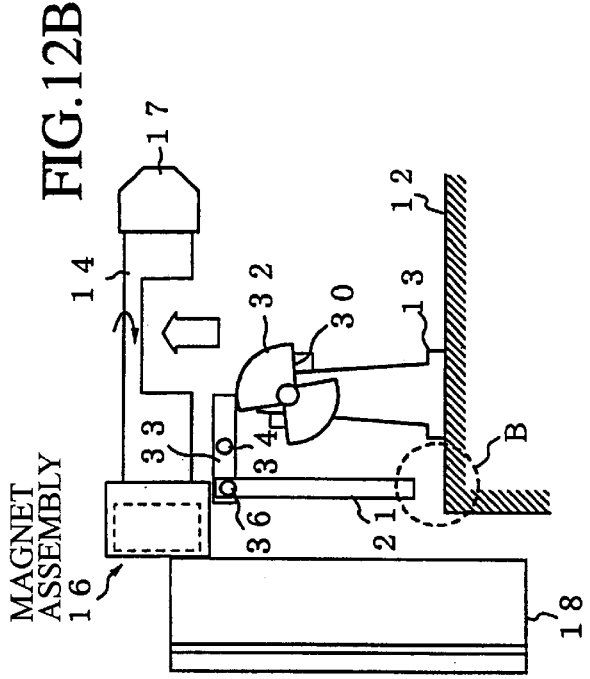
FIGS. 12(a) to (d) are each a front view of another elevator governor check and adjustment system according to a fourth embodiment of the present invention, for explaining its operation.
Figure 12A:
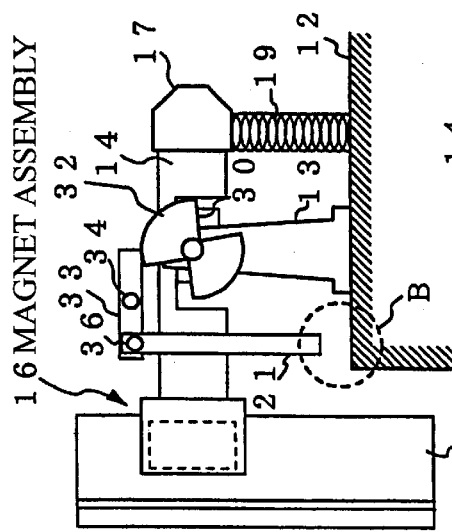
Figure 12C:
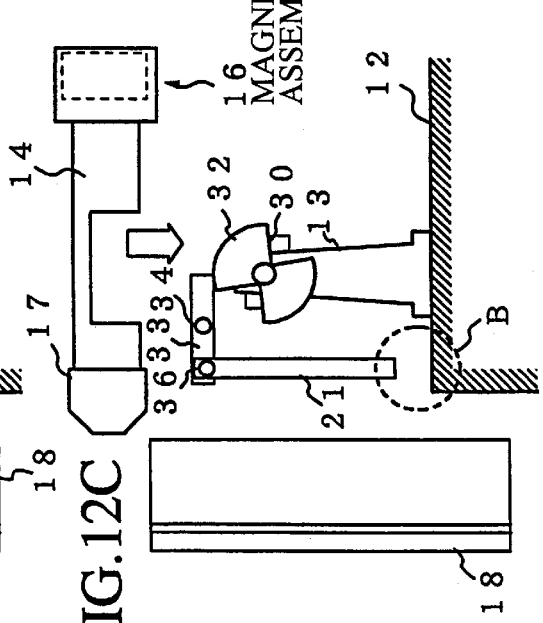
Figure 12D:
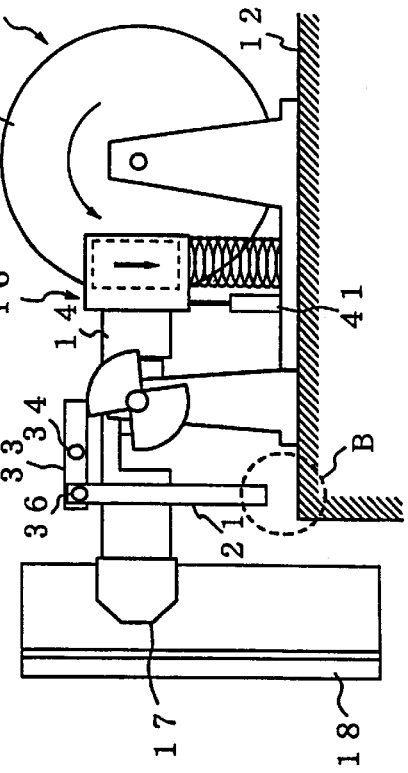

FIGS. 8(a) and (b) are front and plan views depicting the construction of a governor check and adjustment system which employs the method of this embodiment. In FIGS. 8(a) and (b) the parts corresponding to those in Embodiment 1 are identified by the same reference numerals and no description will be repeated thereon. A circle B indicates the disconnection of the pull-up rod 21 from the emergency brakes 31. However, the pull-up rod 21 may sometimes be held connected to the emergency brakes 31 during inspection.

In the actual inspection of the governor, it is difficult in many cases to increase the ascent or descent speed of the elevator car 12 up to the critical speed (for example, 1.3 or 1.4 times higher than the rated speed) and actuate the emergency stop switch 20a or emergency brakes 31 as predetermined when the critical speed is reached.

According to the governor check and adjustment method of this embodiment, a pseudo speed generator 50, which is equipped with a conductive disc 37 of substantially the same magnetic induction property as that of the fixed conductive guide rail 18, is placed at the speed detecting position of the governor. The disc 37 is driven to provide a pseudo elevator running state as if the elevator car 12 is moving in the up or down direction.

In one possible form of the pseudo speed generator 50, the disc 37 is disposed on a support 121 at the position of the fixed conductive guide rail 18 such that the disc 37 rotates in the air gap defined between the two magnets 16a of the magnet assembly 16 of the governor, and a motor, motor-driven drill or similar actuator is connected to the disc 37. An elevator-speed meter 39 is disposed as a revolution sensor near the disc 37.

In the inspection or adjustment of the governor, the pseudo speed generator, which is made up of the disc 37, the support 121 and the actuator, apparently generates the travel speed of the elevator car 12 as if it is actually moving relative to the fixed conductive guide rail 18.

For example, if the fixed conductive guide rail 18 can be removed, then the pseudo speed generator 50 is set with the governor mounted on the elevator car 12. If the guide rail 18 cannot be removed, the governor is dismounted from the elevator car 12 for inspection with the pseudo speed generator 50..

The disc 37 is made of about the same material as that for the fixed conductive guide rail 18 extending vertically the entire length of the elevator hoistway and is nearly equal to the guide rail 18 in thickness. The disc 37 mounted on the pseudo speed generator 50 is disposed at the same position as that of the fixed conductive guide 18 relative to the magnet assembly of the governor. By rotating the disc 37 is created a situation looking as if the elevator car 12 is moving in the up or down direction. Incidentally, the disc 37 may be made of a different material from the fixed conductive guide rail if its properties are known; and the thickness of the disc 37 may also be different from the thickness of the guide rail 18 if it is clear.

In the elevator hoistway the magnet assembly 16 of the governor moves in a straight line with respect to the fixed conductive guide rail 18, but the disc 37 rotates and hence moves curvilinearly with respect to the magnet assembly 16. That is, the rotational speed of the disc 37 differs in the direction of its radius.

Accordingly, the speed of straight-line motion is converted to rotational speed. For example, since the peripheral speed is in proportion to the radius of the disc 37, the rotational speed of the disc 37 at an intermediate point between its outer and inner peripheries, that is, relative to the center of the magnet assembly 16, is defined as a value converted in terms of straight-line motion. In practice, the rotational speed corresponding to the critical speed or speed threshold is experimentally premeasured for use in inspection.

The turning effect may be produced by a motor connected to the pseudo speed generator 50 or motor-driven drill connected to its rotary shaft.

Additionally, marking of the magnets 16a at their centers and the disc 37 at a predetermined position will be of assistance to workers during inspection.

A rotary encoder may be used to measure the number of revolutions of the rotary disc 37, or the elevator speed meter 39 may also be used which is pressed against the disc at a prescribed position (for example, at the marked position) to measure its peripheral speed. Of course, a laser or the like may be employed to measure the peripheral speed of the disc 37.

The governor may be checked on the roof of the elevator car 12 or after being dismounted therefrom. In the latter case, a dedicated base can be used which permits accurate and easy checking of the governor. Also in the case of driving the disc 37 by a motor-driven drill, ample working space is provided. When the governor is not dismounted from the elevator car 12, it is checked in the situation more similar to the actual one—this provides increased reliability of the inspection. Since the governor need not be dismounted from the elevator car 12, its checking can be made easily in a short time.

The disc 37 need not necessarily be made of a conductive material and what is required of the disc 37 is to rotate with respect to the governor at the speed required for inspection.

As described above, according to this embodiment, the use of the pseudo speed generator equipped with the disc 37 permits easy check and adjustment of the governor without actually moving the elevator car 12.

Modification 1

FIG. 9(a) is a front view of a modified form of the elevator governor check and adjustment system according to Embodiment 3, and FIG. 9(b) is its side view as indicated by the arrow in FIG. 9(a). Reference numeral 75 denotes a partly flat, relatively wide conductive belt made of a material whose properties are substantially the same as those of the fixed conductive rail 18; 76 denotes rollers over which the conductive belt 75 is looped such that it is elliptic-cylindrical in cross section as a whole; and 122 denotes a base. The conductive belt 75, the rollers 76 and the base 122 form a pseudo speed generator 51.

According to the governor check and adjustment method of this modification, the pseudo speed generator 51 is provided with the partly flat, relatively wide conductive plate 75, which is driven by a motor, motor-driven drill, or similar actuator.

The pseudo speed generator 51 apparently generates the travel speed of the elevator car 12 with respect to the fixed guide rail 18 for inspection.

This modification differs from Embodiment 3 in that the conductive belt 75 used as a substitute for the fixed conductive guide rail 18 is partly flat This structure creates a situation more similar to that in which the elevator is actually operated, and hence it provides increased reliability in checking the governor.

As described above, this modification makes the pseudo speed generator 51 a little complex in construction but implements measuring the speed of straight-line motion not the rotational speed; accordingly, it is possible to achieve the measurement of speed with higher reliability.

Modification 2

FIG. 10(a) is a front view of another modified form of the elevator governor check and adjustment system according to Embodiment 3, and FIG. 10(b) is its side view as indicated by the arrow in FIG. 10(a). Reference numeral 75' denotes a conductive plate made of a material whose properties are about the same as those of the fixed conductive guide rail 18. The conductive plate 5' is combined with the magnet assembly 16 to form a pseudo speed generator 52.

The method according to this modification is to check and adjust the governor by letting the conductive plate 75' fall freely from a height such that the prescribed overspeed is reached when it passes through the magnet assembly 16. With the pseudo speed generator 52, such an actuator as mentioned above need not provided and the conductive plate 75' needs only to be dropped manually so that it pass through the air gap of the U-shaped magnet assembly 16.

As described above, this modification does not involve any particular additional means, and hence allows inexpensive and simple check and adjustment of the governor.

Incidentally, the disc 37, the substitutes for the fixed conductive guide rail 18 used in Embodiment 3 are not limited specifically in shape to the conductive belt 75 and the conductive plate 75' but they may take any shapes. And the pseudo speed may be generated by other methods such as rocking and so on. It is desirable that the conductive disc, belt and plate be identical with the fixed conductive guide rail 18 in terms of property, shape and thickness, but they may differ, in which case the detected force is converted using a predetermined constant.

Needless to say, these methods can be used for factory-inspection of products.

Embodiment 4

Turning next to FIG. 11, a governor checking and adjustment system according to a fourth embodiment of the invention will be described below.

FIG. 11(*a*) is a front view of the governor normally set in position, FIGS. 11(*b*) and (*c*) front views showing the governor with the arms 14 being turned, and FIG. 11(*d*) a front view showing the governor with a pseudo speed generator 53 combined therewith.

According to this embodiment, the pseudo speed generator 53 similar to that used in Embodiment 3 is mounted on the roof of the elevator car 12 in side-by-side relation to the governor, and the disc 37 is driven which is made of about the same material as that for the fixed conductive guide rail 18 extending vertically the entire length of the elevator hoistway. The method of this embodiment is particularly effective when the fixed conductive guide rail 18 is so rigid that it cannot easily be disengaged from the governor.

The pull-sup rod 21 and the spring 19 are made removable, and the height of a base 123 is chosen such that the balance weight 17 tuns without bumping against the roof of the elevator car 12. The arms 14 have a length or structure such that even when they have turned 180 degrees, the balance weight 17 will not contact the fixed conductive guide rail 18 left unremoved. That is, the balance weight 17 is U-shaped like the back yoke 16*b* to allow the disc 37 to be positioned in the air gap defined by the U-letter shape. If the arm length on the side of the balance weigh is reduced to increase its weight, the height of the base 123 can be chosen more freely.

Furthermore, provision is made to ensure that the disc 37 takes about the same position as does the fixed conductive guide rail 18 after the arms 14 have turned 180 degrees with the balance weight 17 and the magnet assembly 16 exchanged their position. The disc 37 is driven at the prescribed speed by means of a motor, motor-driven drill, or the like.

As shown in FIGS. 11(*a*) to (*d*), the cam 32 is recessed as indicated by 30 and is mounted to the rotary shaft 15 of the arms 14 such that it turns about it. The cam 32 is point-symmetrical in shape with respect to the rotary shaft 15. With such a point-symmetrical cam 32, even when the arms 14 have turned 180 degrees as depicted in FIG. 11(*d*), the disc 37 can be driven under the same conditions as those of the normal operation in the case of FIG. 11(*a*). That is, when he arms 14 have displaced by the rotation of the disc 37, the emergency stop mechanism which actuates the pull-up rod 21 in practice operates in the same manner as in the case of normal operation of the elevator; hence the governor operation can be checked with much ease.

Next, the governor check and adjustment method using the above mechanism will be described.

To begin with, the pull-up rod 21 for actuating the emergency brakes 31 is mechanically disconnected therefrom as indicated by a circle B to keep the brakes 31 from working during the operation of the governor for inspection. Of course, the pull-up rod 21 may also be held connected with the emergency brakes 31 during inspection. Then the arms 14 are turned (FIG. 11(*b*)). The arms 14 can turn 180 degrees with ease since the height of the base 13 is chosen such that the balance weight 17 will not bump against the elevator car frame (FIG. 11(*c*)). After the arms 14 have turned 180 degrees, the pseudo speed generator 53 is disposed with the disc 37 opposite the magnet assembly 16 at approximately the same position as that of the fixed conductive guide rail 18.

By driving the disc 37, it is possible to simulate the operation of the governor in the actual up or down direction run of the elevator car 12. This allows ease in checking to see if the emergency stop mechanism normally operate upon detecting the predetermined critical speed.

In the case of making an adjustment to the governor, a potentiometer 41 is placed under the magnet assembly 16 to measure displacement. Then the disc 37 is driven at prescribed speeds and the displacement of the arms 14 is measured by the potentiometer 41. By this, it is possible to make a check to determine whether predetermined force is produced to displace the arms 14 as predetermined. Alternatively, a load cell (not shown) may disposed at the position of the potentiometer 41 to check the strength or amount of force produced.

Instead of turning the arms 14 through 180 degrees, it is also possible to dismount the governor and exchange the positions of the magnet assembly and the balance weight 17 as depicted in FIGS. 12(*a*) and (*c*). In this case, too, the U-shaped balance weight 17 is disposed opposite the fixed conductive guide rail 18, and the magnet assembly 16 is also disposed relative to the disc 37 of the pseudo speed generator 53 in the same positional relationship of the magnet assembly 16 to the fixed conductive rail 18 as in the case of the normal elevator operation. The potentiometer 41 or the like is placed under the magnet assembly 16 (FIG. 12(*d*)).

As described above, this embodiment permits easy checking and adjustment of the governor that has been impossible with the prior art. The actual running of the elevator car 12 for inspection as in Embodiments 1 and 2 involves complicated and extensive procedures, but according to this embodiment the governor can be checked without the need for actually driving the elevator car 12, and hence its checking and adjustment can be made with safety and with ease. Besides, the governor can be adjusted without being dismounted from the elevator car 12, and consequently the adjustment is also simple and easy.

That is, this embodiment ensures further accurate checking and adjustment of the governor. In addition, since the emergency brakes 31 are held out of operation, safer and simpler checking and adjustment of the governor can be achieved.

Instead of turning the arms 14 through 180 degrees, the governor may be dismounted from the elevator car 12 and tested using the disc 37 at a separate location. The emergency brakes 31 need not necessarily be held out of operation during inspection.

Of course, the method of this embodiment can be used for factory-inspection of products.

Embodiment 5

Figure 13A:
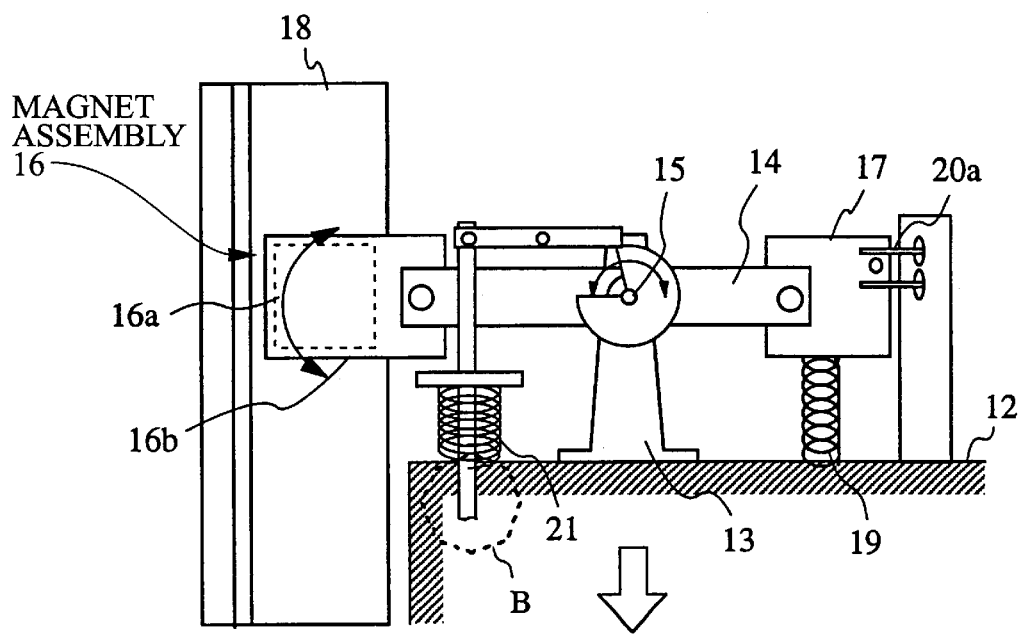
FIG. 13(a) is a front view of an elevator governor check and adjustment system according to a fifth embodiment of the present invention.
Figure 13B:
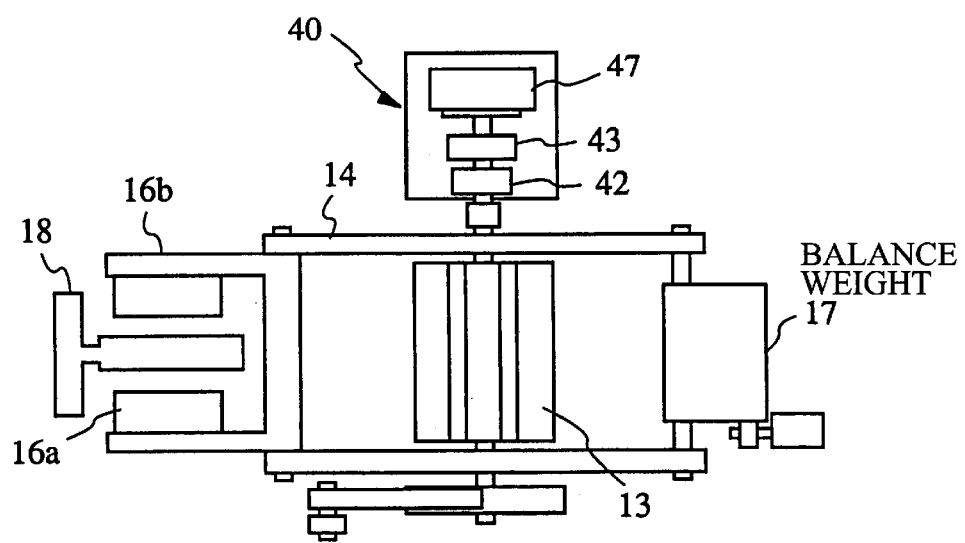
FIG. 13(b) is its top plan view.

Referring next to FIGS. 13(a) and (b), a governor check and adjustment system according to a fifth embodiment (Embodiment 5) will be described below. The governor used is identical in construction and operation with that described above; hence, no detailed description will be given of its basic construction and operation.

Figure 14:
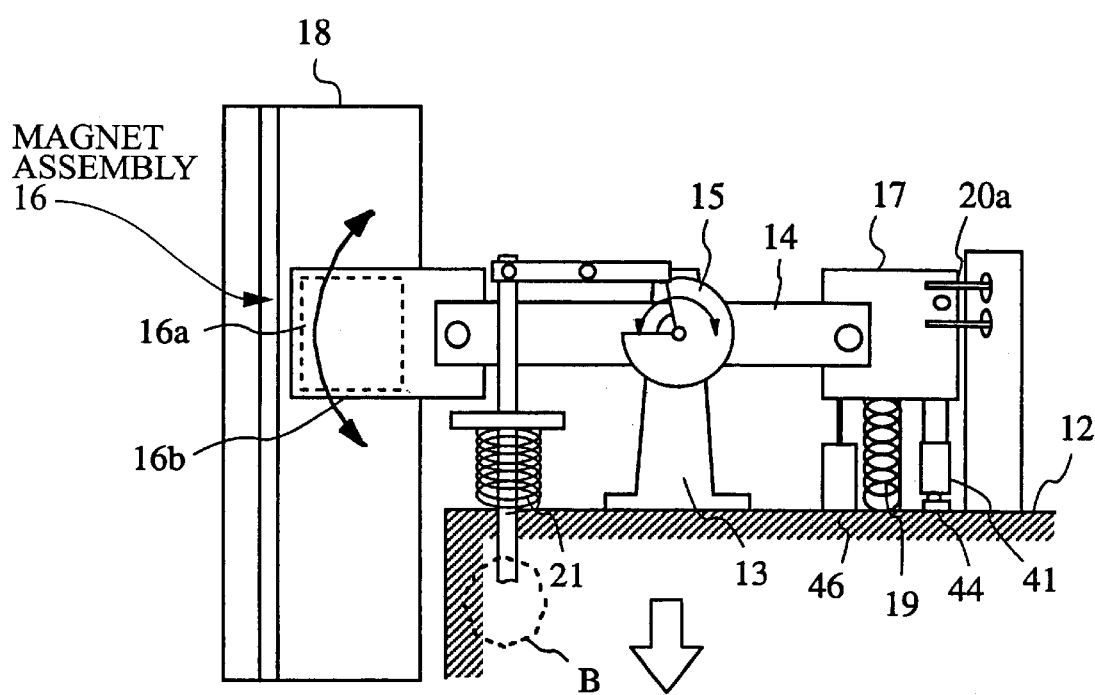
FIG. 14 is a front view of a modified form of the elevator governor check and adjustment system according to the fifth embodiment of the present invention.

FIGS. 13(a) and (b) are front and top plan views of the check and adjustment system of this embodiment. FIG. 14 is a front view of a modified form of the system according to Embodiment 5.

The parts corresponding to those in Embodiment 1 are identified by the same reference numerals. In this embodiment, an adjustment device 47 comprise a motor or similar actuator 47 mounted to the rotary shaft 15 to rock or turn the arms 14, a torque sensor 42 for measuring the load on the arms 14 when they are rocked or turned, and an angle sensor 43 for detecting the rotational angle of the arms 14. The adjustment device 40 is connected to the rotary shaft 15 of the arms 14.

The operation of this governor check and adjustment system will be described below.

To begin with, the pull-up rod 21 for actuating the emergency brakes 31 is mechanically disconnected therefrom as indicated by a circle B to keep the brakes 31 from working during the operation of the governor for inspection. Of course, the pull-up rod 21 may also be held connected with the emergency brakes 31 during inspection. Then the arms 14 are rocked through a fixed angle by the actuator 47. By measuring the ratio between the rocking speed of the magnet assembly 16 and the torque on the rotary shaft 15 at this time, the strength of force generated can be detected for conversion to the displacement of the arms 14. The rocking speed is converted to the travel speed of the elevator car 12 by measuring the physical amount of motion of the arms 14 such as measuring angle variationsby the angle sensor 43.

FIG. 14 depicts a modified form of the governor check and adjustment system of this embodiment, in which the actuator 47, a position sensor 46 such as a potentiometer, and a force sensor 44 such as a load cell are mounted on the balance weight 17. The modified system also produces the same results as mentioned above.

In this way, a check can be made to determine whether the arms 14 are displaced as predetermined at the prescribed speed limit or whether the emergency brakes are triggered when the predetermined overspeed of the elevator car is reached. And, even if the governor does not operate as predetermined, the amount of adjustment to be made to the governor can be made clear.

The system such as Embodiments 1 and 2 involves the actual running of the elevator itself, and hence is highly reliable and accurate, but since the elevator car 12 needs to be driven for checking and adjusting the governor, very complicated and extensive produces are required for inspection and adjustment of the governor. On the other hand, the system such as Embodiment 5 permits easier inspection and adjustment of the governor, and Embodiment 5 uses for inspection and adjustment of the governor the actual fixed conductive guide rail 18, and hence it permits more accurate checking and adjustment of the governor than in Embodiments 3 and 4 which do not require the actual driving of the elevator car 12.

Effect Of The Invention

As described above, the governor checking and adjustment method according to the present invention is suitable for use in checking for ability to operate at critical speeds at the time of installation of an elevator or maintenance.

It will be apparent that many modifications and variations may be effected without departing from the scope of the novel concepts of the present invention.

What is claimed is:

1. A method for checking and adjusting an elevator governor which comprises:

an emergency stop switch for tuning off the power supply of an elevator hoist to brake it;

first and second fixed conductive guide rails extending vertically the entire length of an elevator hoistway;

an emergency brake attached to an elevator car assembly containing an elevator car and a balance weight balancing therewith, for grabbing said first fixed conductive guide rail to brake said elevator car assembly by friction;

a magnet assembly mounted on said elevator car such that it is displaced by an eddy current induced based on the relative speed between said second fixed conductive guide rail and said magnet assembly disposed opposite thereto; and an emergency stop mechanism for actuating said emergency brake upon detecting that the displacement of said magnet assembly has reached displacement corresponding to a critical speed;

wherein said governor is checked and adjusted with said emergency brake and said emergency stop mechanism held disconnected from each other.

2. A method for checking and adjusting an elevator governor which comprises:

an emergency stop switch for tuning off the power supply of an elevator hoist to brake it;

first and second fixed conductive guide rails extending vertically the entire length of an elevator hoistway;

an emergency brake attached to an elevator car assembly containing an elevator car and a balance weight balancing therewith, for grabbing said first fixed conductive guide rail to brake said elevator car assembly by friction;

a magnet assembly mounted on said elevator car such that it is displaced by an eddy current induced based on the relative speed between said second fixed conductive guide rail and said magnet assembly disposed opposite thereto; and an emergency stop mechanism for actuating said emergency brake upon detecting that the displacement of said magnet assembly has reached displacement corresponding to a critical speed;

wherein said governor is checked and adjusted with said emergency brake and said emergency stop mechanism held connected with each other.

3. The method of claim 1, wherein said first and second fixed conductive guide rails are made of the same material.

4. The method of claim 1, wherein said elevator car is actually driven to move in an up or down direction and a check is made to see if said emergency stop switch and said emergency brake operate at predetermined first and second critical speeds of said moving elevator car.

5. The method of claim 4, wherein a force-displacement converter provided with means by which force produced in said magnet assembly in accordance with the travel speed of said elevator car is used, a force-displacement coefficient of said converter being set small such that (rated speed)/(detected critical speed) is obtained, and said elevator car is actually driven to move in said up or down direction during checking and adjusting the operation of said governor.

6. The method of claim 4, wherein an auxiliary magnetic circuit is additionally used so that said force produced in said magnet assembly in accordance with the travel speed of said elevator car becomes (detected critical speed)/(rated speed) at the time of checking and adjustment of said governor, and said elevator car is actually driven to move in said up or down direction.

7. The method of claim 1, wherein said magnet assembly is combined with a pseudo speed generator for generating speed by driving in a straight line or rotating a conductive member made of a material having substantially the same properties as those of the material for said second fixed conductive guide rail.

8. The method of claim 7, wherein said second fixed conductive guide rail is disengaged from said governor and said pseudo speed generator is placed at the position of said second fixed conductive guide rail disengaged.

9. The method of claim 7, wherein the entire governor structure is dismounted from said elevator car assembly and said pseudo speed generator is combined with said governor structure for checking and adjusting said governor.

10. The method of claim 7, wherein a conductive disc unit provided with a disc made of about the same material as that for said second fixed conductive guide rail is placed at the same position as that of said second fixed conductive guide rail, said disc is driven to simulate the actual up or down travel of said elevator car, and a check is made to see if said emergency stop switch and said emergency brake operate at said first and second critical speeds.

11. The method of claim 7, wherein a rotating unit provided with a partly flat cylindrical member made of about the same material as that for said second fixed conductive guide rail is placed at the same position as that of said second fixed conductive guide rail, said cylindrical member is driven to simulate the actual up or down travel of said elevator car, and a check is made to see if said emergency stop switch and said emergency brake operate said first and second critical speeds are reached.

12. The method of claim 7, wherein a conductive plate made of about the same material as that for said second fixed conductive guide rail is placed at the same position as that of said second fixed conductive guide rail, said conductive plate is dropped to fall freely or moved by driving means to simulate the actual up or down travel of said elevator car, and a check is made to see if said emergency stop switch and said emergency brake operate when said first and second critical speeds are reached.

13. The method of claim 1, wherein said magnet assembly comprises a yoke disposed opposite said second fixed conductive guide rail extending the entire length of said elevator hoistway and a pair of opposed magnets mounted on said yoke, and said governor comprises:

a pair of arms rotatably mounted to a rotary shaft of a base mounted on said elevator car, said pair of arms having mounted at one end said magnet assembly and at the other end a balance weight which balances with said magnet assembly; and a converter provided with converting means by which force exerted on said magnet assembly as said elevator car moves in the up or down direction is converted to displacement or rotation of said magnet assembly;

wherein the displacement or rotation of said magnet assembly is transmitted to said emergency stop mechanism, and the height of said base, the length of said pair of arms and the structure of said balance weight are chosen such that said magnet assembly and said balance weight can turn 180 degree.

14. The method of claim 1, wherein said magnet assembly and said balance weight can be dismounted as one piece or separately, and they can be disposed at the position of the other.

15. The method of claim 1, wherein said magnet assembly comprises a yoke disposed opposite said second fixed conductive guide rail extending the entire length of said elevator hoistway and a pair of opposed magnets mounted on said yoke, and said governor comprises:

a pair of arms rotatably mounted to a rotary shaft of a base mounted on said elevator car, said pair of arms having mounted at one end said magnet assembly and at the other end a balance weight which balances with said magnet assembly;

a converter provided with converting means by which force exerted on said magnet assembly as said elevator car moves in the up or down direction is converted to displacement or rotation of said magnet assembly; and an actuator or rotating or rocking said arms;

a first sensor for measuring force exerted on said arms by said actuator;

a second sensor for measuring the physical amount of displacement or angular motion of said arms by said force exerted thereon;

wherein the relation between the speed of said magnet assembly converted from the motion of said arms and the force exerted on said arms by said actuator is compared with a predetermined value to thereby check and adjust the operation timing of said emergency stop switch and said emergency stop mechanism.

* * * * *